Sept. 4, 1928. 1,682,922
C. W. McKONE
RUBBER TIRE BEAD CONSTRUCTION
Filed July 23, 1924
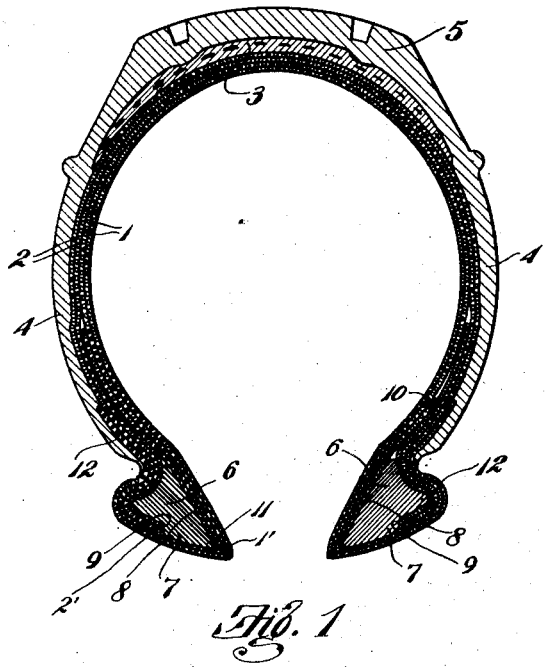
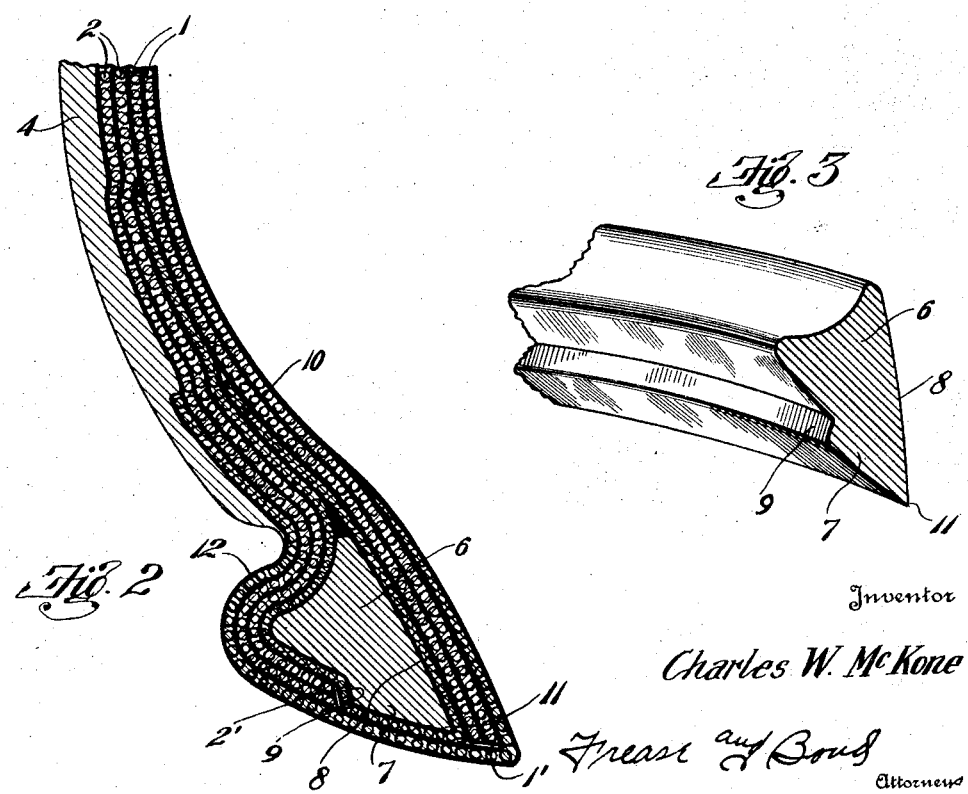
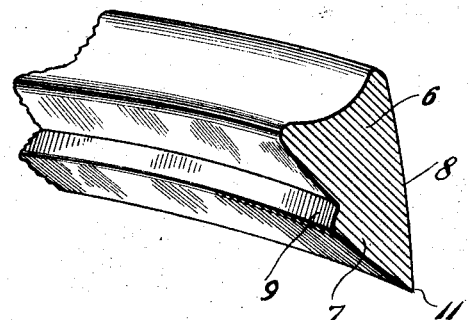
Inventor
Charles W. McKone
Frease and Bond
Attorneys Patented Sept. 4, 1928.

1,682,922

UNITED STATES PATENT OFFICE.

CHARLES W. McKONE, OF CANTON, OHIO.

RUBBER-TIRE-BEAD CONSTRUCTION.

Application filed July 23, 1924. Serial No. 727,783.

The invention relates to the construction of the beads in pneumatic tire casings, and the object of the improvement is to so shape the hard rubber bead core and build the tire bead around it, as to overcome the tendency of the inner pointed edge of the bead to spring or bend upward and pinch the inner tube, and incidentally to reduce the amount of fabric required for building the tire casing.

When a bead core shaped with a triangular cross section is enveloped with one or more of the outer plies of fabric usually built in a tire, the pointed inner angular edge of the bead and the adjacent bottom side thereof are so positioned above and cushioned on the rim of a wheel by the enveloping layer or layers of fabric, as to tend to spring upward and pinch an inner tube against the angular edge of the opposite bead.

This difficulty is overcome by increasing the depth of the inner part of the under side of the bead core, to the extent of the thickness of enveloping plies of fabric, and to terminate the enveloping ply or plies of fabric against the annular shoulder thus formed in the under side of the bead core.

The modified sectional shape of the bead core, and the termination of the enveloping ply or plies of fabric at the outer side thereof, brings the pointed angular edge and the inner portion of the bead core downward very close to the rim of a wheel upon which the tire may be seated; in which position the pointed inner edge of the bead tends to push under an inner tube, rather than to impinge the side thereof.

The improved construction is illustrated in the accompanying drawings, forming part hereof, in which—

Figure 1 is a cross section of a tire provided with the improved bead.

Fig. 2, a section on an enlarged scale of one bead portion of the tire; and

Fig. 3, a fragmentary perspective view of a portion of the improved bead core.

Similar numerals refer to similar parts throughout the drawing.

The tire casing illustrated, is built up of a plurality of plies of cord fabric, indicated at 1 and 2, four plies being shown extended entirely around the body of the casing, the plies 1—1, being upon the interior of the tire and the plies 2—2, surrounding the same.

These plies of cord fabric may be impregnated with rubber composition in the usual manner, and the usual breaker strip 3 may be provided around the central portion of the same. Upon the outer side of the cord fabric structure above described, are placed the side walls 4 and tread 5.

The bead cores to which the invention pertains, are indicated at 6 and are substantially the same as the beads in common use, with the exception of the increased depth 7 upon the under side of the bead which increases the length of the inner side 8 of the bead core and forms the annular shoulder 9 on the lower side of the bead.

A flipper strip 10, of ordinary square woven fabric, may be wrapped entirely around the bead in the usual manner, the ends thereof being overlapped and extended between the fabric strips 1—1 and 2—2. The innermost strips 1—1 of fabric are placed over the inner side of each bead, terminating at the inner pointed edge or toe 11 of the bead as at 1'.

The outer fabric strips 2—2 extend around the outer side of the bead and terminate at the shoulder 9, as shown at 2', instead of being extended entirely across the under side of the bead in the usual manner. The entire bead of the tire may be surrounded by a chafer strip of square woven fabric 12, terminating a short distance above the bead upon the inner and outer sides thereof.

The increased depth 7 of the inner portion of the bead core not only strengthens the same, but extends the toe edge thereof downward very close to the bottom of the tire bead proper, without, however, making any change in the external sectional configuration of the same; and at the same time, a substantial saving is effected by decreasing the width of the enveloping plies of fabric.

I claim:

A multiple ply fabric tire comprising a bead core triangular in cross-section and with its inner face widened to extend the toe of the core and provide a recess on its base face marked by a shoulder therein, certain plies of fabric extending across the inner side of the core and terminating adjacent its toe and certain other plies of fabric extending around the outside of the core and terminating at said shoulder in the base side thereof, substantially as set forth.

In testimony that I claim the above I have hereunto subscribed my name.

CHARLES W. McKONE.